Dec. 29, 1931.  W. E. GEDDES  1,838,388
SAFETY BRAKE BEAM SUPPORT FOR CAR TRUCKS
Filed Sept. 12, 1930  3 Sheets-Sheet 1
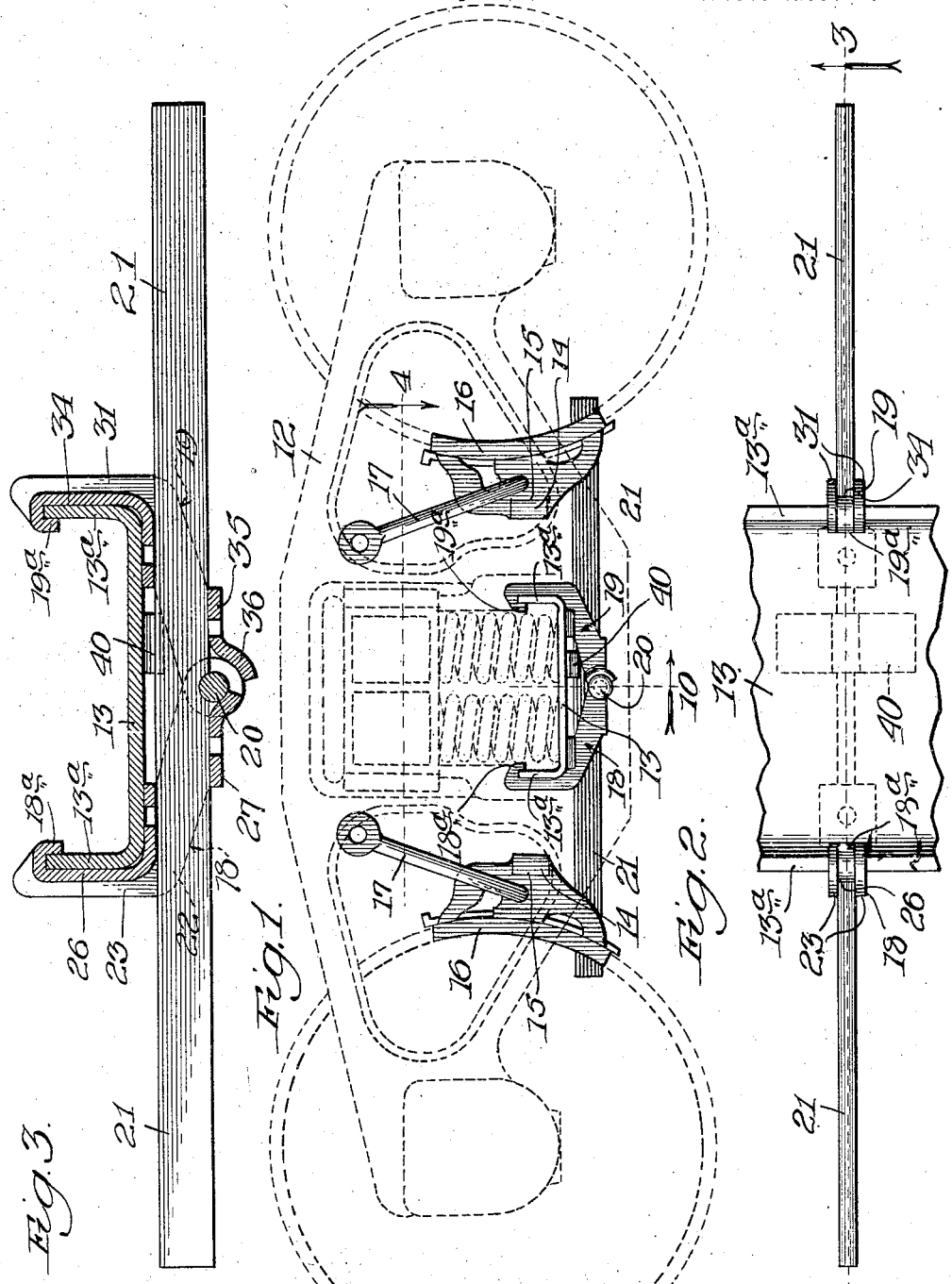

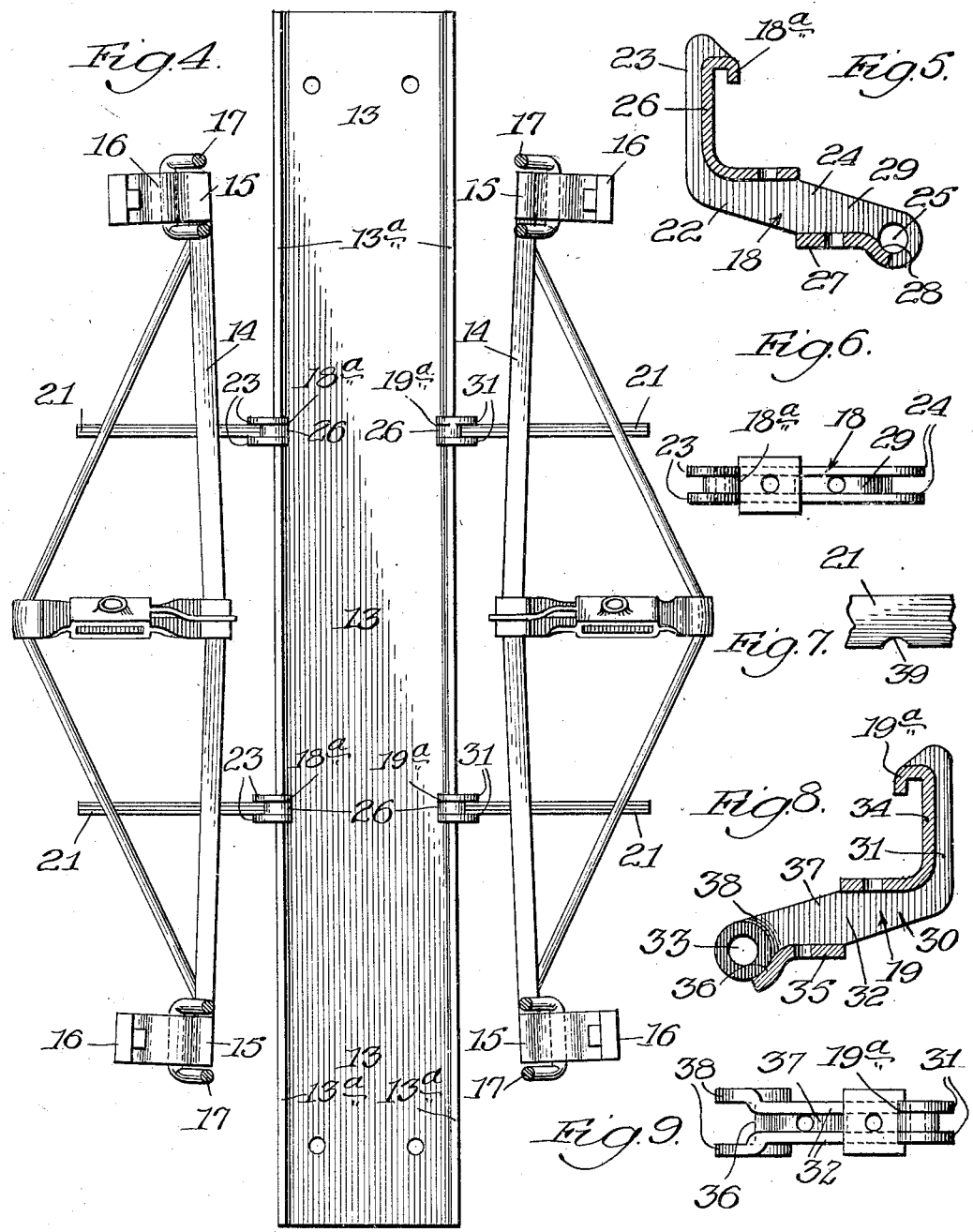

Dec. 29, 1931.    W. E. GEDDES    1,838,388
SAFETY BRAKE BEAM SUPPORT FOR CAR TRUCKS
Filed Sept. 12, 1930    3 Sheets-Sheet 3

Inventor:
William E. Geddes

Patented Dec. 29, 1931

1,838,388

UNITED STATES PATENT OFFICE

WILLIAM E. GEDDES, OF CHICAGO, ILLINOIS, ASSIGNOR TO GENERAL AMERICAN TANK CAR CORPORATION, OF CHICAGO, ILLINOIS, A CORPORATION OF WEST VIRGINIA

SAFETY BRAKE-BEAM SUPPORT FOR CAR TRUCKS

Application filed September 12, 1930. Serial No. 481,532.

My invention relates to means, commonly provided on car trucks, for preventing the brake-beams from falling onto the track in case any portion of the brake-rigging supporting the brake-beams, as for example, the brake-beam-supporting hangers, becomes broken, these means commonly comprising a bar secured to the spring plank of the truck to extend crosswise thereof, with its ends extending below the brake-beams cooperating with the wheels of the truck and in a position to arrest falling of the brake-beams should the parts supporting them break, and hold them elevated above the track, thus avoiding danger of impairment of the track and rolling stock, and averting accidents.

One of my objects is to provide a novel, simple and economical construction of safety means for the purpose above stated.

Another object is to provide a construction of safety means which may be easily and quickly assembled with the truck and disassembled therefrom when desired.

Another object is to dispense with the use of bolts or rivets engaging the truck for holding the safety bar in position.

Another object is to provide a construction whereby the safety bar may be readily released and shifted out of a position in which it obstructs free access to the brake-beam adjacent either end thereof; and other objects as will be manifest from the following description.

Referring to the accompanying drawings:

Figure 1 is a view in side elevation of the brake-beam-equipped truck of a railway car provided with safety brake-beam-supports in accordance with my invention, certain of the parts of the illustrated structure being shown by dotted lines.

Figure 2 is a broken plan view of the spring-plank of the truck of Fig. 1 and of my improved safety means in position thereon.

Figure 3 is a view in longitudinal sectional elevation of the structure shown in Fig. 2, the section being taken at the line 3 on Fig. 2 and viewed in the direction of the arrow.

Figure 4 is an enlarged plan view of those parts of the structure which are shown by full lines in Fig. 1.

Figure 5 is a view in longitudinal sectional elevation of one of the bracket-members of my improved safety means.

Figure 6 is a plan view of the member of Fig. 5.

Figure 7 is a broken view in side elevation of the central part of a bar forming another part of my improved safety means.

Figure 8 is a view in longitudinal sectional elevation of the other bracket-member of the safety means.

Figure 9 is a plan view of the bracket member of Fig. 8.

Figure 10:
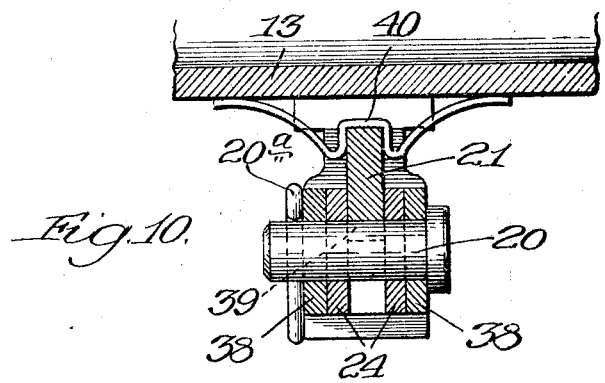
Figure 10 is an enlarged section taken at the line 10 on Fig. 1 and viewed in the direction of the arrow.

Referring to the construction shown in Figs. 1 to 10, inclusive, 12 represents one of the side-frames of a railway-car truck of a conventional form and 13 a spring-plank of a form commonly used and connecting together the side frames of the truck, the spring-plank being shown as of channel-form presenting upwardly extending parallel flanges 13ª at its opposite longitudinal edges and extending substantially from one truck side-frame to the other thereof.

The brake-beams commonly employed are represented at 14 these beams being located at opposite sides of the truck and each provided at its opposite ends with brake-heads 15 carrying brake-shoes 16 for cooperation with the wheels of the truck, the brake-beams 14 being swingably supported, in accordance with common practice, by means of hangers 17 pivoted at their upper ends to the truck-frame.

My improved safety means in the construction now being described comprises a structure located at each side of the center line of the truck, as shown in Fig. 4, and formed of a pair of bracket-members 18 and 19, a connecting headed pin 20 and a bar 21, the latter extending lengthwise of the car with its ends projecting beyond the spring-plank 13 into a position in which it directly underlies the brake-beams 14, as shown, to form a support upon which the brake-beams, should either of the hangers 17 become broken, will drop and be held up thereby.

The bracket members 18 and 19, which are provided to embracingly engage the spring-plank 13 and seat in notches (not shown) in the upper edges of the flanges $13^a$ are provided at their upper ends with hooks $18^a$ and $19^a$, respectively, at which they hook over, and thus interlock with, the upper edges of the flanges $13^a$.

The bracket member 18 comprises a pair of angle-shaped spaced-apart portions 22 presenting upwardly extending arms 23 and inwardly extending arms 24 in the inner, terminal, ends of which openings 25 are provided. The portions 22 are connected together by a crosswise extending portion 26 along the inner marginal edges of the portions 22 the upper end of which forms the hook $18^a$ and by a crosswise extending portion 27 extending along the lower marginal edges of the arms 24, the inner edge of the portion 27 being curved at 28 to conform to the openings 25. The portions 22, 26 and 27 are preferably formed integrally and the structure thus provided presents a substantially horizontally extending passage 29 extending therethrough.

The bracket member 19 comprises a pair of angle-shaped spaced-apart portions 30 presenting upwardly extending arms 31 and inwardly extending arms 32 in the inner terminal ends of which openings 33 are provided. The portions 31 are connected together by a crosswise extending portion 34 along the inner marginal edges of the portions 31 the upper end of which forms the hook $19^a$ and by a crosswise extending portion 35 extending along the lower marginal edges of the arms 32, the inner edge of the portion 35 being curved at 36 to conform to the openings 33. The portions 30, 34 and 35 are preferably integrally formed and the structure thus provided presents a substantially horizontally extending passage 37 extending therethrough.

The inner ends of the arms 32 are offset outwardly as represented at 38 to receive the inner ends of the arms 24 between them upon the assembling of the bracket members with the spring plank to the position shown in Figs. 1, 2 and 3, in which position the bracket members 18 and 19 are held by the pin 20 inserted through the registering openings 25 and 33 in these bracket members, the pin 20 being held in place by a cotter pin $20^a$ extending through an opening therein.

The bar 21 is provided mid-way between its ends at its lower edge with a notch 39 and is assembled with the bracket-members 18 and 19, before the pin 20 has been inserted, by sliding the bar lengthwise through the alining passages 29 and 37 into the position shown in Figs. 1, 2 and 3.

The pin 20 is then inserted through the registering openings 25 and 33 and the notch 39 thereby securely holding the bracket members 18 and 19 in interlocked position on the spring plank and the bar 21 against lengthwise movement, the bar 21 being seated on the portions 27 and 35 of the bracket members.

I prefer to employ means for preventing the rattling of the parts of the safety means described, these means being shown as comprising a spring plate 40 under compression between the upper edge of the bar 21 and the underside of the spring-plank 13.

Figure 11:
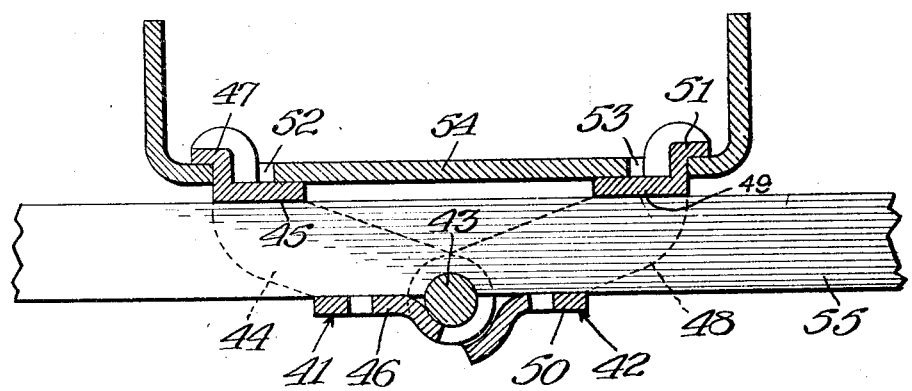
Figure 11, a view like Fig. 3 of a modification of the safety means of the preceding figures.

In Fig. 11 I have illustrated a form of safety means which I prefer to employ where it is desired that the interlock between the bracket members and the truck-proper be at a substantially horizontally extending portion of the latter, either where the spring plank is of the channel form shown in the preceding figures and the spacing of the flanges thereof is not according to the standard spacing for which the bracket members of the preceding figures are provided, or where the spring-plank has no flanges.

In this construction the bracket members are represented at 41 and 42 and connect together at their inner lapping ends by a pin 43 as explained of the construction of the preceding figures.

The bracket 41 is formed of spaced apart side portions 44 corresponding with the portions 24 and crosswise extending portions 45 and 46, the portion 46 corresponding with the portion 27 and the portion 45 extending across the upper ends of the portions 44 and being formed with a terminal offset angle-shaped lug 47.

The bracket 42 is formed of spaced apart side portions 48, corresponding with the portions 30, and crosswise extending portions 49 and 50, the portion 50 corresponding with the portion 35 and the portion 49 extending across the upper ends of the portions 48 and being formed with a terminal offset angle-shaped lug 51.

The lugs 47 and 51 which extend in opposite directions are adapted to be inserted upwardly through holes 52 and 53 formed in the base of the spring plank herein represented at 54 and when positioned as shown interlock with the plank for holding them securely in place when the bracket members are coupled together by the pin 43.

The safety-bar herein shown at 55 is the same as the bar 21 and is associated with the pin 43 and bracket members 41 and 42 as described of the bar 21.

While I have illustrated and described certain forms in which my invention may be provided, I do not wish to be understood as intending to limit it thereto as the invention may be embodied in other forms and those shown may be variously modified and altered without departing from the spirit of my invention.

What I claim as new, and desire to secure by Letters Patent, is:

1. The combination of a railway-car truck, a brake-beam adjacent thereto, a brake-beam-support bar, and means for supporting said bar comprising a plurality of one-piece bracket members of angular shape interlocked with said truck, said bracket members containing openings through which said bar extends, and a pin connecting adjacent ends of said members together and holding them in said interlocked position.

2. The combination of a railway-car truck, a brake-beam adjacent thereto, a brake-beam-support bar, and means for supporting said bar comprising a plurality of one-piece bracket members of angular shape interlocked with said truck, said bracket members containing openings through which said bar extends, and a pin connecting adjacent ends of said members together and holding them in said interlocked position and engaging said bar.

3. The combination of a railway-car truck, a brake-beam adjacent thereto, a brake-beam-support bar containing a notch in an edge thereof, and means for supporting said bar comprising a plurality of bracket members interlocked with said truck and a pin connecting said members together and holding them in said interlocked position and extending into said notch.

4. The combination of a railway-car truck, a brake-beam adjacent thereto, a brake-beam-support bar, and means for supporting said bar comprising a plurality of one-piece bracket members of angular shape interlocked with said truck, said bracket members containing openings through which said bar extends, and presenting a seat for said bar and a pin connecting adjacent ends of said members together and holding them in said interlocked position.

5. The combination of a railway-car truck, a brake-beam adjacent thereto, a brake-beam-support bar, and means for supporting said bar comprising a plurality of one-piece bracket members of angular shape interlocked with said truck, said bracket members containing openings through which said bar extends and presenting a seat for said bar and a pin connecting adjacent ends of said members together and holding them in said interlocked position and engaging said bar.

6. The combination of a railway-car truck, a brake-beam adjacent thereto, a brake-beam-support bar containing a notch in an edge thereof, and means for supporting said bar comprising a plurality of bracket members interlocked with said truck and presenting a seat for said bar and a pin connecting said members together and holding them in said interlocked position and extending through said notch.

7. The combination of a railway-car truck, a brake-beam adjacent thereto, a brake-beam-support bar, and means for supporting said bar comprising a plurality of one-piece bracket members of angular shape having hook ends at which they are adapted to be hooked over edge portions of said truck, said bracket members containing openings through which said bar extends, and a pin connecting adjacent ends of said members together and holding them against disengagement at their hooked portions from said truck.

8. The combination of a railway car truck having a spring plank with upwardly extending flanges along opposite edges thereof, a brake-beam-support bar, and means for supporting said bar comprising a plurality of one-piece bracket members of angular shape having hook ends at which they are interlocked with the upper edges of said flanges, said bracket members containing openings through which said bar extends, and a pin connecting adjacent ends of said members together and holding them against disengagement at their hooked portion from said flanges.

9. The combination of a railway-car truck containing openings through a substantially horizontal portion thereof, a brake-beam adjacent thereto, a brake-beam-support bar, and means for supporting said bar comprising a plurality of one-piece bracket members of angular shape having shouldered end portions at which they extend through said openings and interlock with said truck, said bracket members containing openings through which said bar extends, and a pin connecting adjacent ends of said members together and holding them in said interlocked position.

10. The combination of a railway-car truck containing openings through a substantially horizontal portion thereof, a brake-beam adjacent thereto, a brake-beam-support bar, and means for supporting said bar comprising a plurality of one-piece bracket members of angular shape having shouldered end portions at which they extend through said openings and interlock with said truck, said bracket members containing openings through which said bar extends, and a pin connecting adjacent ends of said members together and holding them in said interlocked position and engaging said bar.

11. The combination of a railway car truck, a brake beam adjacent thereto, a brake-beam-support bar, and means for supporting said bar comprising a plurality of one-piece bracket members of angular shape extending lengthwise along said bar and forming a seat therefor and interlocked with said truck and a pin connecting adjacent ends of said bracket members together and holding them in said interlocked position.

WILLIAM E. GEDDES.